United States Patent [19]
Holcombe

[11] 3,877,584
[45] Apr. 15, 1975

[54] APPARATUS FOR LOADING SOD ON PALLETS

[76] Inventor: James E. Holcombe, 2331 E. Long Lake Rd., Troy, Mich.

[22] Filed: Oct. 9, 1973

[21] Appl. No.: 404,227

[52] U.S. Cl............. 214/6 B; 214/6 DK; 214/6 P; 172/19
[51] Int. Cl............................................ B65g 57/32
[58] Field of Search............ 172/19, 20, 1; 214/6 P, 214/6 DK, 6 H, 6 B, 60 K

[56] References Cited
UNITED STATES PATENTS

| | | | |
|---|---|---|---|
| 2,985,322 | 5/1961 | Parker | 214/6 DK |
| 3,111,233 | 11/1963 | Raynor | 214/6 P |
| 3,164,211 | 1/1965 | Scott | 172/19 |
| 3,519,082 | 7/1970 | Miner | 172/1 |
| 3,675,793 | 7/1972 | Wetzel | 214/6 B |
| 3,688,920 | 9/1972 | Frish | 214/6 H |

FOREIGN PATENTS OR APPLICATIONS

| | | | |
|---|---|---|---|
| 207,375 | 2/1957 | Australia | 214/6 P |

*Primary Examiner*—Stephen C. Pellegrino
*Attorney, Agent, or Firm*—Charles W. Chandler

[57] ABSTRACT

A trailer for automatically stacking sod on pallets, is pulled behind a tractor having means for harvesting the sod from the ground. A stack of pallets, carried by the trailer, are individually fed to the top of a chain-operated elevator for receiving individual slabs of sod. As sod is being stacked on a pallet in the elevator, the pallet is progressively lowered until fully stacked. It is then dropped to the ground as an empty pallet is being fed into the elevator.

7 Claims, 7 Drawing Figures

APPARATUS FOR LOADING SOD ON PALLETS

BACKGROUND OF THE INVENTION

This invention is related to apparatus for stacking pallets with sod as it is being harvested from the ground.

Sod harvesting machines remove sod from the ground in slabs which are then usually manually stacked on pallets. Normally two men handle the sod because of its size and weight. The harvesting rate is often limited by the rate at which the sod slabs can be stacked on the pallets.

SUMMARY OF THE INVENTION

The broad purpose of the present invention is to provide apparatus for stacking sod on pallets as the sod is being harvested from the ground, and for automatically positioning an empty pallet to receive the sod when a loaded pallet has been fully stacked.

Still further objects and advantages of the invention will become readily apparent to those skilled in the art to which the invention pertains upon reference to the following detailed description.

DESCRIPTION OF THE DRAWINGS

The description refers to the accompanying drawing in which like reference characters refer to like parts throughout the several views and in which.

DESCRIPTION OF THE PREFERRED EMBODIMENT

Figure 1:
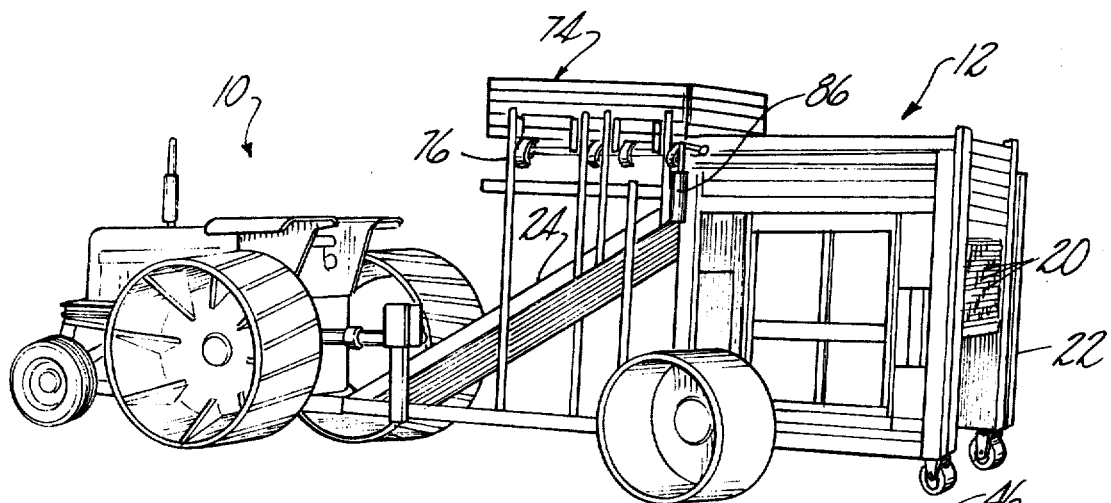
FIG. 1 is a perspective view of apparatus for stacking sod slabs on pallets, illustrating the preferred embodiment of the invention.
Figure 2:
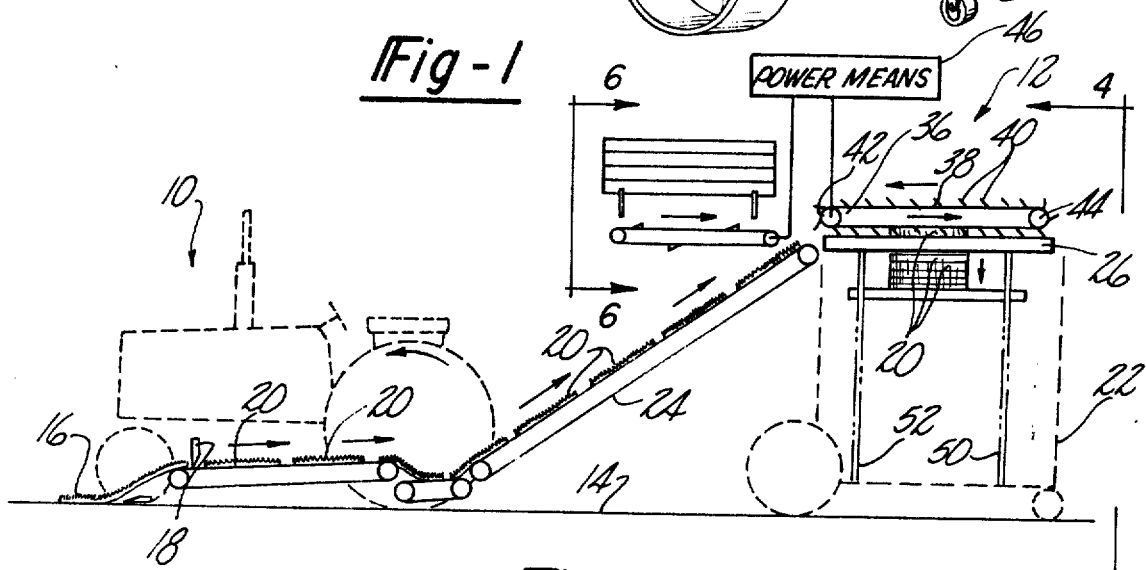
FIG. 2 is a diagramatic illustration showing the manner in which the sod is loaded onto a pallet.
Figure 3:
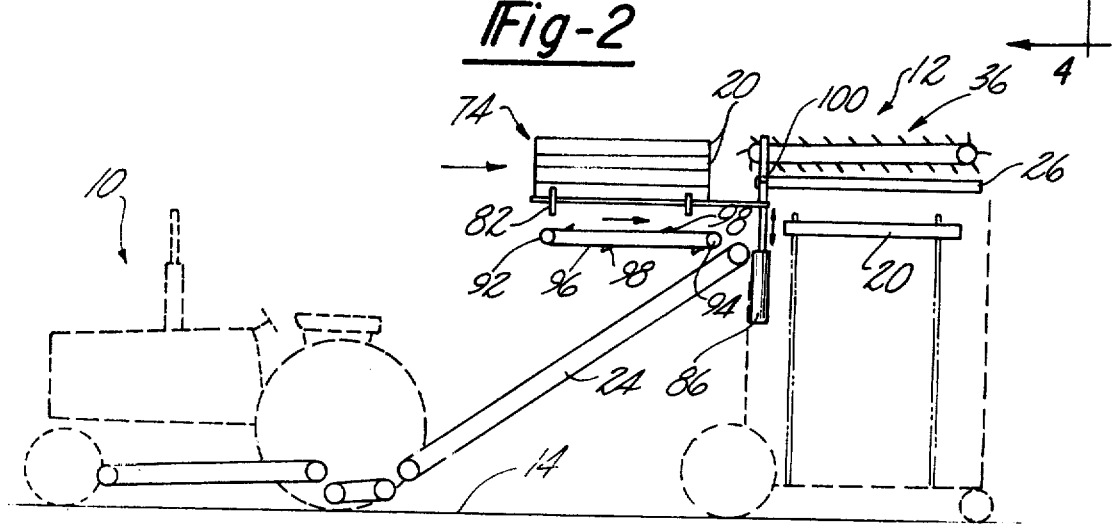
FIG. 3 is a view similar to FIG. 2 but showing the manner in which an empty pallet is moved into the elevator for receiving sod.

Now referring to FIGS. 1–3, a tractor 10 is illustrated as towing a trailer 12 across ground 14 for harvesting sod 16.

As tractor 10 is advanced across the ground, the sod is harvested from the ground in an elongated strip and then cut by knife means 18 to form slabs 20. Knife means 18 can comprise any conventional sod harvesting means.

Figure 4:
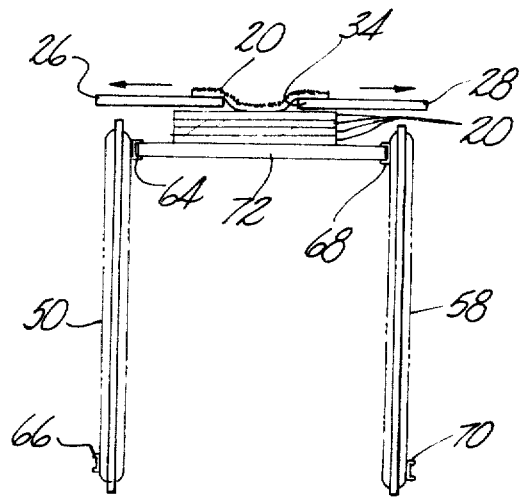
FIG. 4 is a view taken along lines 4—4 of FIG. 2.

Trailer 12 includes a wheeled frame 22 and an elongated belt conveyor 24 mounted between the tractor and frame 22. A pair of movable plate-like supports 26 and 28 are mounted on top of frame 22. As best illustrated in FIG. 4, linkage means 30 connect supports 26 and 28 to power means 32 for moving the two supports away from one another to form an opening 34. In the closed position, shown in FIG. 5, supports 26 and 28 are adjacent one to the other to receive a slab 20 from the upper end of conveyor 24.

Referring to FIG. 2, as the leading edge of a slab 20 engages the two supports, a rake means 36 engages the sod and positions it in a central position spanning the two supports. The rake means comprises a series of power-driven chains 38 having a plurality of teeth 40 for engaging the sod. The chains are mounted on pulleys 42 and 44, pulley 44 being connected to power means 46 such that the lower portion of each chain moves parallel to supports 26 and 28 and is spaced above the supports a distance accommodating the thickness of the sod slabs.

An elevator 48 is mounted beneath supports 26 and 28. Elevator 48 comprises a pair of vertical, parallel chains 50 and 52 mounted along one side of frame 22. A drive shaft 54 is connected to the upper ends of the chains and a companion shaft 56 supports appropriate sprocket means 56 at the lower end of the chains.

A second pair of elevator chains 58 (only one which is shown) are mounted on the opposite side of the frame means parallel to chains 50 and 52. A drive shaft 60, connected to power means 32, is engaged with the upper ends of chains 58, and an idler shaft 62 is engaged with the lower ends of these chains. Drive shaft 54 is also connected to power means 32 so that the chains on both sides of the elevator move together, the inner half of each chain being moved downwardly as the outer half is being moved upwardly.

A pair of elongated pallet supporting channels 64 and 66 are mounted on chains 50 and 52 and a second pair of channels 68 and 70 are mounted on the elevator chains on the opposite side of the frame such that as each channel is being lowered, it is opposed by another channel on the opposite side of the elevator frame. The channels are parallel to one another to receive a conventional wooden pallet 72 which is supported in a position parallel to ground 14.

Referring to FIG. 4, as supports 26 and 28 are being moved away from one another, a sod slab 20 that has been positioned on the supports, is dropped onto pallet 72 in such a manner that consecutive slabs become progressively vertically stacked on the pallet. Power means 32 has an appropriate control such that after each slab is stacked on the pallet, the pallet is then lowered a distance accommodating the thickness of the slab to accommodate the next slab that is to be stacked on the pallet.

Figure 5:
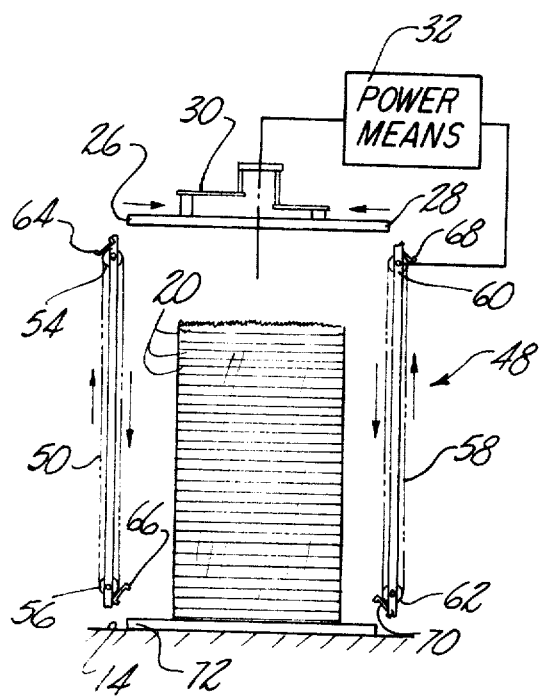
FIG. 5 is a view similar to FIG. 4 but showing a fully stacked pallet being dropped to the ground.

Referring to FIG. 5, a selected number of slabs are stacked on the pallet. As the pallet approaches lower shafts 56 and 62, the channels supporting the pallet are each rotated away from one another to release their respective side edges of the pallet thereby dropping the pallet and its load onto the ground. The empty channels then travel toward the upper end of the elevator while the other pair of channels 64 and 66 are descending with another pallet on the loading half of the cycle.

Figure 6:
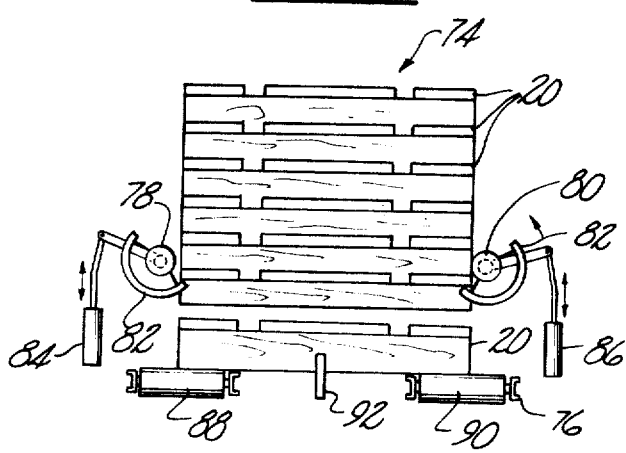
FIG. 6 is an enlarged view taken along lines 6—6 of FIG. 2.
Figure 7:
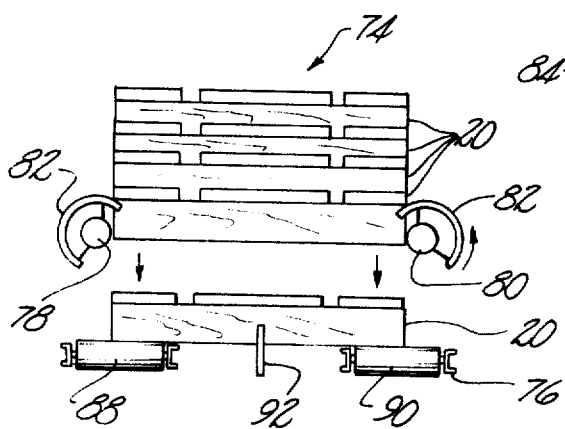
FIG. 7 is a view similar to FIG. 6 showing the manner in which an empty pallet is fed to the elevator.

Referring to FIGS. 3, 6 and 7, pallet-loading apparatus 74 is mounted forwardly of power rake means 36. Pallet-loading apparatus includes a frame 76 mounted above conveyor 24. A pair of parallel shafts 78 and 80 are mounted on opposite sides of frame 76 a distance apart slightly greater than the width of pallets 20.

A plurality of semi-circular fingers 82 are carried on shafts 78 and 80. Shafts 78 and 80 are connected to hydraulic actuators 84 and 86 which are mounted on opposite sides of frame 76. The two actuators are arranged to move the fingers 82 between a first position illustrated in FIGS. 6 and a second position illustrated in FIG. 7.

Referring to FIG. 6, the lower edges of fingers 82 are engaged with the lowermost pallet 20 of the stack of empty pallets. In FIG. 7, the upper ends of the fingers are passed beneath the next pallet as the lower finger ends are moved away from the lowermost pallet to release it. The lowermost pallet then drops on a pair of conveyor means 88 and 90.

To lower the next empty pallet onto the conveyor means, the lower edges of the fingers are pivoted toward one another to form a seat for receiving a pallet being released by the upper ends of the fingers. By repeating the previous release motion, that is moving the lower ends of the fingers away from one another, another pallet can be individually fed from the stack of empty pallets. This pallet feeding operation is triggered by a pair of channels, such as 64 and 68, being positioned in the elevator to receive an empty pallet.

As best illustrated in FIG. 3, drive means comprising a sprocket 92 and a sprocket 94 support a chain 96 having dogs 98 moving a pallet 20 on conveyor means 88 and 90 to a position in which it is seated in a pair of channels in the elevator.

Supports 26 and 28, and rake means 36 are connected to actuators 86 and 84 by connecting means 100 so as to be raised above the path of motion of an empty pallet 20 being passed from conveyor means 88 and 90 toward the elevator channels. When the empty pallet has been received in the elevator, supports 26 and 28, and the rake means are lowered to their normal operative position for receiving sod slabs.

It is to be understood that I have described my invention in its simplest terms and that appropriate control means are connected to the various power means so that the entire sod loading operation is automatic and operates continuously as sod is being harvested. Thus the newly cut sod is raised by conveyor means 24 to the top of the elevator and loaded on a pallet 20 in the elevator. As the pallet is being loaded with sod slabs, it is progressively lowered in the elevator until a predetermined number of slabs are stacked on the pallet. When the pallet is fully loaded it is lowered and dropped on the ground. Another, empty pallet is then positioned at the top of the elevator to repeat the loading cycle.

Having described my invention, I claim:

1. Apparatus for loading on pallets sod being harvested from the ground, comprising:
   a wheeled frame and means connected thereto for advancing the frame across the ground;
   conveyor means having an upper end and a lower end carried by the frame for raising a slab of sod of a predetermined length from the lower end to the upper end of the conveyor means;
   a pair of plates slidably supported on said frame in a substantially horizontal, co-planar relationship adjacent the upper end of the conveyor means so as to be movable between a closed position, substantially in abutment one with the other, for receiving the slab of sod in a first position;
   rake means mounted above the plates for engaging the slab of sod being discharged from the upper end of the conveyor means and slidably moving the slab on the plates toward said first position;
   a pallet disposed on said frame beneath the closed position of the plates for receiving the slab of sod in a stacked position on the pallet, and;
   means connected to the plates for moving them toward an open position in which one plates is so spaced with respect to the other as to permit the slab of sod mounted thereon in said first position to drop down between the plates onto said pallet as the plates are being moved toward said open position.

2. Apparatus as defined in claim 1, including elevator means mounted on the frame and supporting the pallet, the elevator means being operative to lower the pallet toward the ground as similarly shaped slabs of sod are stacked on the first mentioned slab of sod.

3. Apparatus as defined in claim 1, in which the slab of sod is mounted on the plates such that the midsection of the slab drops through the open position between the plates before the side edges of the slab pass between the plates.

4. Apparatus as defined in claim 1, including a second pallet and means for raising the pair of plates to form an opening for receiving the second pallet along a path of motion between the conveyor means and the plates toward a position beneath the plates.

5. Apparatus as defined in claim 1, including conveyor means mounted on the frame, a plurality of pallets stacked one above the other, and means for individually feeding the lower-most pallet of the stack to a position beneath the plates for receiving sod being delivered from the plates.

6. Apparatus as defined in claim 1, in which the rake means comprises a chain member disposed to move parallel to said plates, and including a plurality of teeth carried along said chain for engaging the sod.

7. Apparatus as defined in claim 1, in which the elevator means are mounted on the frame and disposed to engage the pallet beneath said plates, said elevator means including a pair of chains supported in spaced parallel relationship on opposite sides of the pallet, power means for moving the chains, and means carried by the chains for engaging the pallet whereby it is moved from an upper position in which it is disposed to receive sod toward a lower position in which the pallet of sod is released from the elevator means.

* * * * *